United States Patent [19]

Charbonnel

[11] Patent Number: 4,561,867

[45] Date of Patent: Dec. 31, 1985

[54] APPARATUS FOR SEPARATING A LIQUID FROM A GAS, PARTICULARLY FOR TURBOENGINE BEARING CASES

[75] Inventor: Jean-Louis Charbonnel, Le Mee sur Seine, France

[73] Assignee: Societe Nationale d'Etude et de Construction de Moteurs d'Aviation "S.N.E.C.M.A.", Paris, France

[21] Appl. No.: 679,903

[22] Filed: Dec. 10, 1984

[30] Foreign Application Priority Data

Dec. 14, 1983 [FR] France ................................ 83 19986

[51] Int. Cl.⁴ ............................................. B01D 19/00
[52] U.S. Cl. ....................................... 55/202; 55/203; 55/409; 184/6.23
[58] Field of Search .................. 55/202, 205, 403–409, 55/410; 184/6.21, 6.23

[56] References Cited

U.S. PATENT DOCUMENTS

| | | | |
|---|---|---|---|
| 3,209,518 | 10/1965 | Spulgis et al. | 55/404 X |
| 3,378,104 | 4/1968 | Venable | 55/409 X |
| 3,415,383 | 12/1968 | Earle et al. | 55/408 X |
| 3,486,314 | 12/1969 | Herrington | 55/408 |
| 3,561,195 | 2/1971 | Bouru | 55/409 |
| 3,712,032 | 1/1973 | Obligado | 55/409 |
| 3,810,347 | 5/1974 | Kartinen | 55/203 X |
| 4,049,401 | 9/1977 | Smith | 55/184 |

FOREIGN PATENT DOCUMENTS

| | | |
|---|---|---|
| 1502216 | 11/1966 | France . |
| 1590886 | 6/1968 | France . |
| 2033022 | 11/1970 | France . |
| 1042778 | 9/1983 | U.S.S.R. ................................ 55/404 |

*Primary Examiner*—Charles Hart
*Attorney, Agent, or Firm*—Bacon & Thomas

[57] ABSTRACT

The gas-liquid separation device consists of two concentric pipes rotationally driven about their common longitudinal axis and between them defining first and second longitudinally extending channels. The mixture is passed into the first channels and the second channels collect and evacuate the liquid particles which have been separated from the gas in the first channel. The device may be mounted within a shaft of a turboengine and be used to de-oil the ventilating air of turboengine bearing cases. It may be combined with a mounting sleeve which also serves to distribute the lubricating oil of the bearings within the case.

21 Claims, 4 Drawing Figures

APPARATUS FOR SEPARATING A LIQUID FROM A GAS, PARTICULARLY FOR TURBOENGINE BEARING CASES

BACKGROUND OF THE INVENTION

1. Field of the Invention

The present invention relates to an apparatus for the purification of gases, in particular the removal of oil from air circulated through turboengine bearing cases.

2. Brief Description of the Prior Art

The entrainment of lubricating oil in air passing through turboengines occurs near labyrinth seals utilized to seal relatively moving elements of the turboengine due to pressure variations across the labyrinth seal structure. The oil entrained in the air presents problems regarding the operation of the turboengine, particularly the loss of bearing lubrication oil, the danger of fire should the entrained oil contact hot engine parts, and the danger of polluting cabin air circulation circuits. Even in the strongly turbulent state around the labyrinth seal structure, a mist of fine oil droplets in suspension is formed within the bearing case. Absent any effort to recover as much of this oil as possible, the amount of oil entrained in the air would be sufficient to rapidly deplete the lubricating oil reservoir, thereby limiting the operational radius of the aircraft or causing bearing failure.

Liquid separation equipment, commonly known as de-oilers, are presently used in jet turbine engines to recover as much as the entrained oil as possible. Typically, such equipment utilizes centrifugal forces to separate the oil from the air and comprises a rotor, driven by the engine shaft or otherwise, against which the gas-liquid mixture is directed. French Pat. No. 1,590,886 describes such a centrifugal separator in which a hollow rotor is provided with radial blades to centrifuge the liquid droplets from the air. A perforated sleeve located along the fins is provided with evacuation passages for removal of the recovered liquid. The purified gas is evacuated to the outside through a duct within an internal pipe.

Although the efficiency of such a device is well known, its bulk represents a substantial drawback to its efficient useage. The bulk of the device renders it difficult to place on the engine and to supply the requisite rotational force to the rotor. Although it can be mounted within the accessory support on the engine, large size conduits must be provided to limit the fluid load losses and to limit the heat leaks of the conduits passing through the main air flow. All of these factors result in an increase of the mass and complexity of the engine. The de-oiler also may be mounted against the engine shaft, but would increase the overall length of the device and necessitate an increase in the volume of the bearing sections.

Another centrifugal separation device is shown in French Pat. No. 2,033,022 wherein the oil-air mixture from the bearing cases is guided toward a central conduit fashioned within the engine shaft by forcing it to cross radial passages in such a manner that the denser oil particles are centrifugally separated. A second separation is carried out within the central passage where the particles, having acquired an eddying motion are collected along its inside wall. This device has been found to be less efficient than the previously described centrifugal separator. Furthermore, since it is integral with the shaft, it is much less amenable to installation, modification and servicing, and decreases the mechanical strength of the shaft structure.

SUMMARY OF THE INVENTION

The instant invention is directed toward an apparatus for separating liquid particles from a gas having an efficiency equal to that of the centrifugal separator of the prior art devices, but being much more compact to enable its mounting within a shaft of a turboengine. The apparatus comprises the first and second concentric hollow pipes which are rotationally driven about their common longitudinal axis. The second or outer concentric pipe defines an inlet allowing the gas-liquid mixture to pass into the first channels defined by the first and second pipes, and by longitudinally extending partition walls. A plurality of first orifices are defined by the partition walls to allow separated liquid to pass into a plurality of second channels. A plurality of second orifices are defined by the second pipe and communicate with the second channels to permit the withdrawal of the separated oil. The purified gas passes into the interior of the first pipe and is withdrawn therefrom.

The separated liquid is collected inside the second channels along the entire path of the gas-liquid mixture and may be evacuated therefrom by orifices arranged in a common, transverse plane. This eliminates the need for a bulky casing structure covering the separator assembly, as shown in French Pat. No. 1,502,216.

The apparatus according to the invention is particularly adaptable for de-oiling the ventilating air of turboengine bearing cases and may be easily mounted within the turboengine shaft near the bearings. A mounting sleeve which attaches the apparatus to the interior of the hollow shaft may define, in combination with the shaft interior, a plurality of chambers, one of which may collect the oil emanating from the apparatus and return it to the lubricating oil reservoir. Additional chambers may be formed between the mounting sleeve and the exterior of the second pipe of the apparatus such that lubricating oil may be supplied thereto and, in turn, passed along to the lubricating feed circuits of the turboengine.

DETAILED DESCRIPTION OF THE PREFERRED EMBODIMENT

Figure 1:
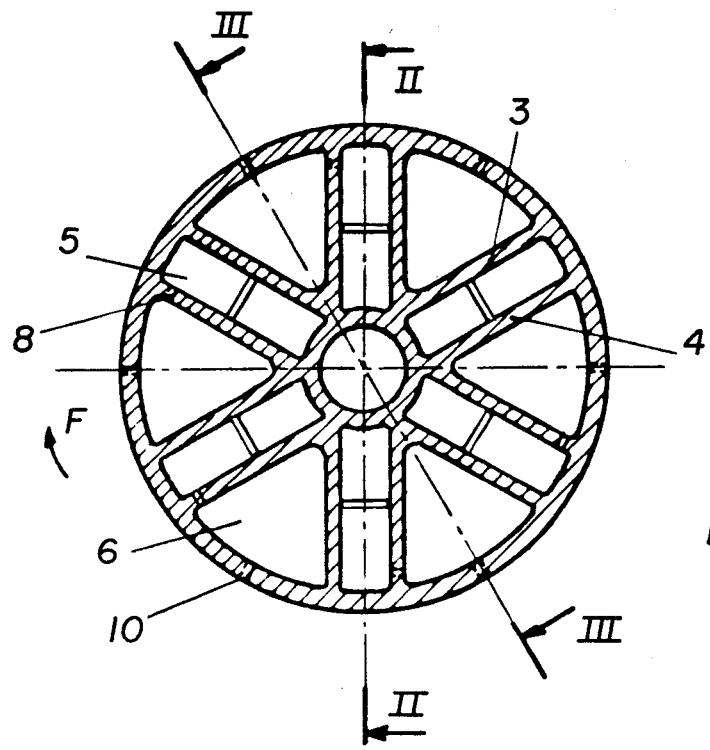
FIG. 1 shows a transverse cross-section of the separation apparatus according to the invention.
Figure 2:
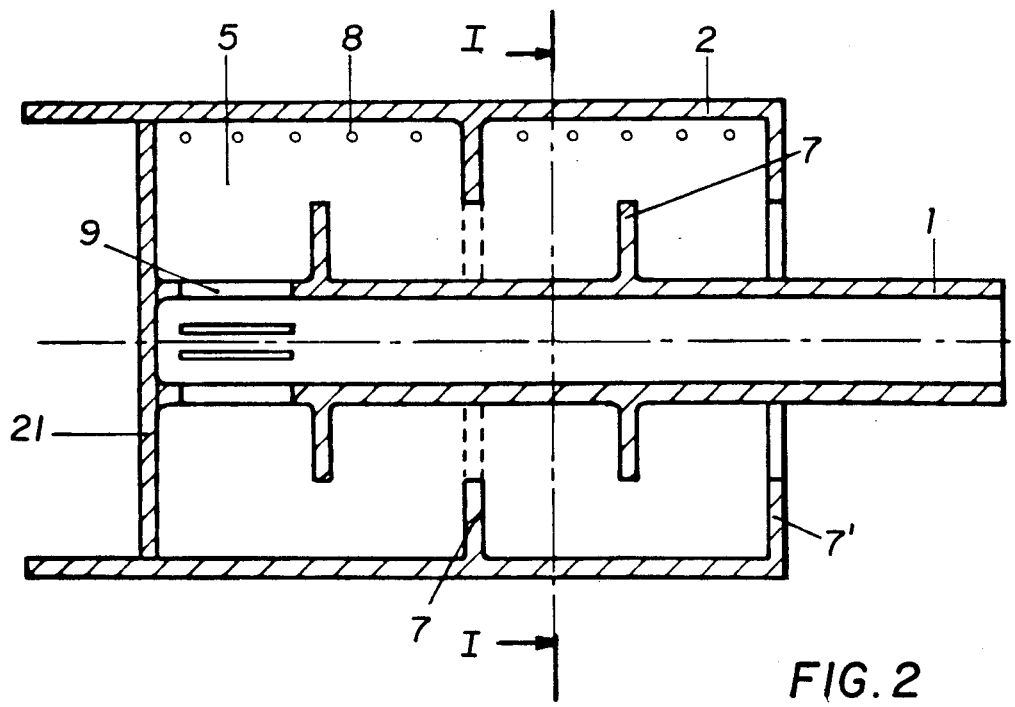
FIG. 2 shows a longitudinal sectional view taken along line II—II in FIG. 1.
Figure 3:
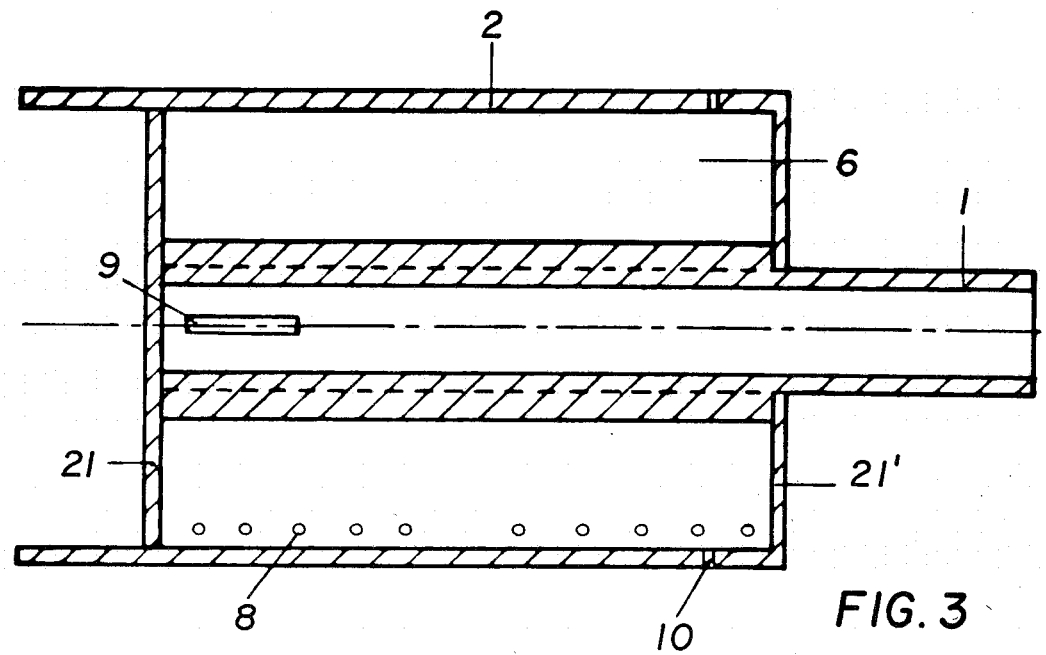
FIG. 3 is a longitudinal sectional view taken along lines III—III in FIG. 1.

The apparatus according to the invention comprises a first, inner pipe 1 and a second, outer pipe 2 arranged concentrically with respect to each other so as to have a common longitudinal axis. Means (not shown) are provided to rotate the first and second pipes about their common longitudinal axis. Pipes 1 and 2 are closed near one end by cross wall 21 while, as shown in FIGS. 2 and 3, first pipe 1 projects beyond the extremity of pipe 2. The first and second pipes 1 and 2 are interconnected by partition means comprising pairs of longitudinal partition walls 3 and 4, best shown in FIG. 1. Each pair of the partition walls 3 and 4 define first channels 5 between them. Second channels 6 are defined by the second pipe 2 and adjacent partition walls. Longitudinal partition walls 3 and 4 may be oriented such that, in each pair, the walls are parallel to each other, as shown in FIG. 1. This arrangement thus defines second channels 6 as being generally triangular in cross-section. However, longitudinal partition walls 3 and 4 may be oriented differently without exceeding the scope of the invention.

First channels 5 are each provided with transverse baffles 7 which sequentially extend from first pipe 1 and second pipe 2 as best shown in FIG. 2. Each of these baffles 7 extend approximately to one-half the height of first channels 5. Baffle 7', located at one end of outer pipe 2, defines an inlet passage through which the gas-liquid mixture is directed. Each of the first channels 5 also communicate with the interior of inner pipe 1 through radial slots 9 in the wall of pipe 1. The purified air or other gas may be evacuated through the interior of inner pipe 1.

Each of the first channels 5 also communicate with an adjacent second channel 6 through first orifices 8 extending through longitudinal partition walls 3. First orifices 8 are located only in this partition wall such that, as the device is rotated in the direction of arrow F, shown in FIG. 1, the separated oil may pass through these first orifices in a direction opposite to that of the rotation. The ends of second channels 6 are sealed by transverse partitions 21 and 21', as best seen in FIG. 3. Each of these channels communicate with the exterior of the device through second orifices 10 which may be arranged in a common, transverse plane near the inlet end of outer pipe 2.

Figure 4:
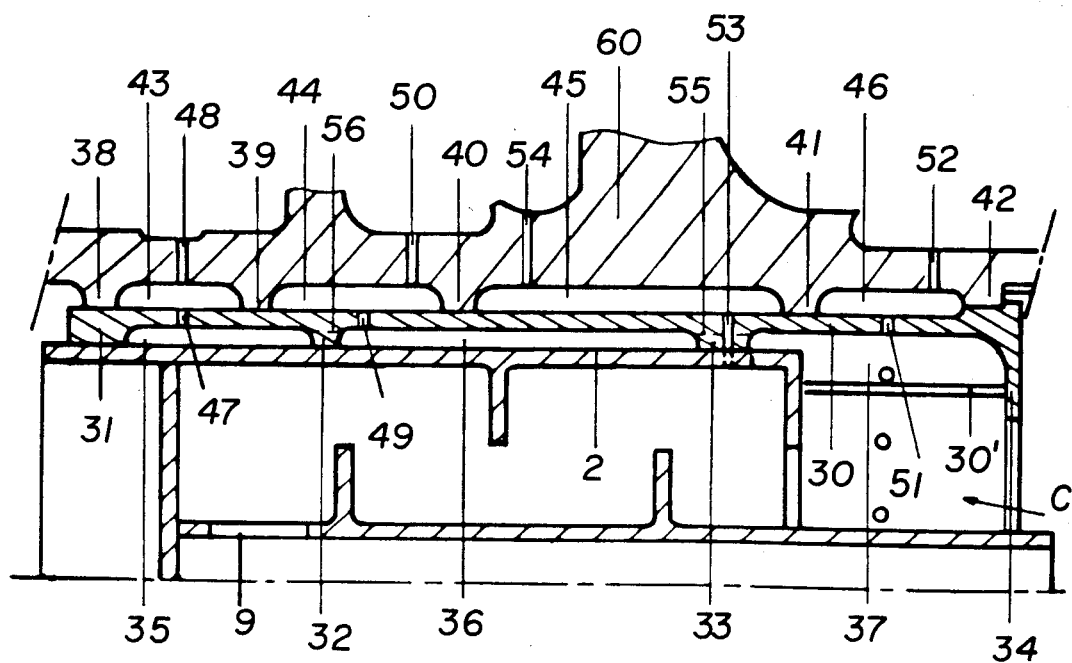
FIG. 4 is a partial longitudinal sectional view showing the apparatus according to the invention installed in a low pressure shaft of a turboengine.

FIG. 4 shows the apparatus according to the invention installed in a low pressure shaft of a turboengine and used for de-oiling the air ventilating the turboengine bearing cases. The downstream end of the low pressure shaft 60 is rotationally supported by bearings with respect to a fixed bearing block connected to the casing of the turboengine (not shown). Low pressure shaft 60 may itself rotationally support a high pressure shaft through an intershaft bearing. This intershaft bearing structure, which is well-known in the prior art, typically consists of roller bearings distributed between an inner race formed integral with the low pressure shaft and an outer race which is formed integrally with the high pressure shaft journal. For the sake of clarity, these known components have been omitted from FIG. 4.

The de-oiler apparatus is mounted within the low pressure shaft 60 by means of cylindrical sleeve 30. Sleeve 30, which may also serve to distribute the bearing lubication oil, is joined to the shaft 60 by any known means which will prevent any relative rotation between them. Longitudinal ribs 30' are provided on the interior of sleeve 30 to add additional stiffness to the structure. Sleeve 30 is provided with end walls 31 and 34 and two intermediate annular transverse walls 32 and 33. The inner peripheries of transverse walls 31, 32 and 33 bear against the outer periphery of pipe 2 in order to retain the device in position. The length of sleeve 30 exceeds that of pipe 2 such that end wall 34, with transverse wall 33 define an annular chamber 37. Additional chambers 35 and 36 are defined between transverse wall 31 and 32, and 32 and 33, respectively. Longitudinal openings 55 and 56 are circumferentially spaced through partitions 33 and 32, respectively, to provide communication between chambers 35, 36 and 37.

The exterior of sleeve 30, in conjunction with transverse annular walls 38, 39, 40, 41 and 42 formed on the interior of low pressure shaft 60 defines annular chambers 43, 44, 45 and 46. Radial holes 47, 49 and 51, provided through sleeve 30, provide communication between chambers 35 and 43; 36 and 44; and 37 and 46, respectively. Lubricating oil, which may be supplied by a nozzle, schematically indicated by arrow C is centrifuged in chamber 37 where it forms a pressurized liquid ring. The oil communicates with chambers 36 and 35 through longitudinal openings 55 and 56 and subsequently passes into chambers 43, 44 and 46 through radial openings 47, 49 and 51. From these chambers, the oil may be supplied to the lubricating oil feed circuit of the turboengine structure. Chamber 43 may communicate with the inner race of the intershaft roller bearing through radial passage 48, while chamber 44 may supply lubricating oil to the outer race of the intershaft bearing through radial passage 50. Similarly, chamber 46 may supply lubricating oil to the bearing which supports low pressure shaft 60 through radial passage 52.

Chamber 45, formed between transverse annular walls 40 and 41 communicates with the second channels 6 of the separating device via radial passages 53 which are aligned with second orifices 10 through the outer pipe 2. The oil collected in this chamber may be returned to the lubricating oil reservoir through radial passage 54.

As noted previously, the air in the bearing cases must be evacuated to the outside in order to maintain a blocking air flow through the labyrinth seals located between the fixed walls of the turboengine case and the rotor engine elements. The air is contaminated with oil droplets which must be removed before the air is evacuated. This oil-air mixture enters the inlet formed by transverse wall 7' and enters the first channels 5. Due to the rotational movement of the device, a tangential velocity is imparted to the mixture. The constant cross-section of first channels 5 enhances the laminar flow thereby limiting the load loses. The oil-gas mixture follows a meridian trajectory and is sequentially subjected to a centrifugal and centripetal movement as it passes over baffles 7. The elements have different densities are separated and the inertia of the droplets causes them to be deposited along the partition walls.

The collected oil moves through first orifices 8 into second channels 6 and along the inside wall of pipe 2. The oil is evacuated through second orifices 10 and passes into chamber 45 through radial passages 53.

The purified air after passing the last baffle 7 is deflected into radial slots 9 toward the interior of first pipe 1 and may be withdrawn therefrom for further useage.

The foregoing is provided for illustrative purposes only and should not be construed as in any way limiting this invention, the scope of which is defined solely by the appended claims.

What is claimed is:

1. Apparatus for separating liquid from a gas comprising:
   (a) a first hollow pipe;
   (b) a second pipe concentrically arranged with respect to the first pipe, the second pipe defining an inlet for a gas-liquid mixture;
   (c) a plurality of partition means extending generally parallel to the longitudinal axis of the first and second pipes and interconnecting the first and second pipes, the partition means defining a plurality of first channels communicating with the inlet;

(d) a plurality of second channels defined by the second pipe and adjacent partition means;

(e) a plurality of first orifices defined by the partition means to allow liquid to pass from a first channel into an adjacent second channel;

(f) a plurality of second orifices defined by the second pipe communicating with the second channels so as to permit evacuation of the liquid therefrom;

(g) outlet means defined by the first pipe and communicating with the first channels to allow the gas to be withdrawn therefrom; and, (h) means to rotate the first and second pipes.

2. The separating apparatus of claim 1 wherein each partition means comprises: a pair of longitudinally extending partition walls, each extending between the first and second pipes and defining therebetween a first channel.

3. The separating apparatus of claim 2 wherein in each pair of partition walls the walls are parallel to each other.

4. The separating apparatus of claim 3 further comprising:

(a) radially outwardly extending transverse baffles extending from the first pipe into the first channels; and, (b) radially inwardly extending transverse baffles extending from the second pipe into the first channels, the inwardly extending transverse baffles being longitudinally displaced with respect to the outwardly extending transverse baffles so as to sequentially impart centrifugal and centripetal movement to the gas-liquid mixture.

5. The separating apparatus of claim 4 wherein the plurality of first orifices are defined by one of each pair of partition walls so as to allow liquid to pass therethrough in a direction opposite to that of the direction of rotation of the first and second pipes.

6. The separating apparatus of claim 5 wherein the plurality of second orifices are located in a common transverse plane adjacent the plane of the inlet.

7. The separating apparatus of claim 6 wherein the plurality of first orifices are distributed along the length of the partition walls.

8. The separating apparatus of claim 7 wherein the first and second pipes are cylindrical in shape.

9. Apparatus for separating oil from the ventilation air of a bearing case of a turboengine having at least one rotatable hollow shaft comprising:

(a) a first hollow pipe;

(b) a second pipe concentrically arranged with respect to the first pipe, the second pipe defining an inlet for a gas-liquid mixture;

(c) a plurality of partition means extending generally parllel to the longitudinal axis of the first and second pipes and interconnecting the first and second pipes, the partition means defining a plurality of first channels communicating with the inlet;

(d) a plurality of second channels defined by the second pipe and adjacent partition means;

(e) a plurality of first orifices defined by the partition means to allow liquid to pass from a first channel into an adjacent second channel;

(f) a plurality of second orifices defined by the second pipe communicating with the second channels so as to permit evacuation of the liquid therefrom;

(g) outlet means defined by the first pipe and communicating with the first channels to allow the gas to be withdrawn therefrom; and, (h) mounting means to attach the second pipe to the interior of the hollow shaft such that the apparatus rotates therewith.

10. The apparatus of claim 9 wherein the mounting means comprises:

(a) a hollow sleeve attached to the interior of the hollow shaft; and (b) a plurality of annular transverse walls extending inwardly from the sleeve so as to support the second pipe therein.

11. The apparatus of claim 10 wherein the sleeve defines a first plurality of chambers with the interior of the hollow shaft and further comprising: first passage means communicating with at least one chamber and the plurality of second orifices to allow separated oil to pass into at least one chamber; and, second passage means communicating with the at least one chamber and an oil reservoir to allow separated oil to be returned to the oil reservoir.

12. The apparatus of claim 11 wherein the turboengine has feed circuits to feed oil to various bearings contained therein and wherein the plurality of annular transverse walls define a plurality of second chambers, further comprising:

(a) lubricating oil supply means to supply lubricating oil to the plurality of second chambers; and, (b) second passage means communicating with the second chambers and the oil feed circuits to supply oil thereto.

13. The apparatus of claim 12 wherein one of the second chambers centrifugally collects oil from the oil supply means and feeds the oil to the remaining second chambers.

14. The apparatus of claim 13 wherein the plurality of annular transverse walls define longitudinal openings to allow communication between the plurality of second chambers.

15. The separating apparatus of claim 14 wherein each partition means comprises: a pair of longitudinally extending partition walls, each extending between the first and second pipes and defining therebetween a first channel.

16. The separating apparatus of claim 15 wherein in each pair of partition walls the walls are parallel to each other.

17. The separating apparatus of claim 3 further comprising:

(a) radially outwardly extending transverse baffles extending from the first pipe into the first channels; and, (b) radially inwardly extending transverse baffles extending from the second pipe into the first channels, the inwardly extending transverse baffles being longitudinally displaced with respect to the outwardly extending transverse baffles so as to sequentially impart centrifugal and centripetal movement to the gas-liquid mixture.

18. The separating apparatus of claim 17 wherein the plurality of first orifices are defined by one of each pair of partition walls so as to allow liquid to pass therethrough in a direction opposite to that of the direction of rotation of the first and second pipes.

19. The separating apparatus of claim 18 wherein the plurality of second orifices are located in a common transverse plane adjacent the plane of the inlet.

20. The separating apparatus of claim 19 wherein the plurality of first orifices are distributed along the length of the partition walls.

21. The separating apparatus of claim 20 wherein the first and second pipes are cylindrical in shape.

* * * * *

UNITED STATES PATENT AND TRADEMARK OFFICE
CERTIFICATE OF CORRECTION

PATENT NO. : 4,561,867
DATED : December 31, 1985
INVENTOR(S) : CHARBONNEL

It is certified that error appears in the above-identified patent and that said Letters Patent is hereby corrected as shown below:

Col. 1, line 45: "useage" should read --usage--;
Col. 4, line 16: "lubicating" should read --lubricating--;
Col. 4, line 54: "useage" should read --usage--;
Col. 5, line 54: "parllel" should read --parallel--;

Signed and Sealed this

Twenty-third Day of September 1986

[SEAL]

Attest:

DONALD J. QUIGG

Attesting Officer

Commissioner of Patents and Trademarks